United States Patent Office 2,730,505
Patented Jan. 10, 1956

2,730,505

INCREASING THE VISCOSITY OF GUAR SOLS BY REACTION WITH FORMALDEHYDE

Wesley A. Jordan, Minneapolis, Minn., assignor to General Mills, Inc., a corporation of Delaware No Drawing. Application May 28, 1954,
Serial No. 433,276

5 Claims. (Cl. 252—311)

The present invention relates to a process of improving the viscosity and other characteristics of guar sols by the addition of formaldehyde thereto.

It is, therefore, an object of the present invention to provide a process of improving the viscosity of guar sols by the incorporation of formaldehyde therein. It is another object of the present invention to provide a novel composition of matter composed of guar gum and formaldehyde.

The invention is applicable to guar gum in any of its forms. Guar gum is obtained from guar seeds, which are composed of a pair of cotyledons which are separated by an embryo. The entire seed is enclosed within a seed coat. Guar gum may be variously isolated from the seed by either dry or wet milling or extraction techniques. In one form of dry milling manufacture of guar it is possible to obtain various guar fractions containing varying quantities of guar gum and varying quantities of embryo.

The invention is applicable to all of these dry milled products as well as to guar products which are obtained by aqueous extraction techniques. The effect of the formaldehyde may vary with the particular sample of guar or with the particular type of product. However, an increase in viscosity has been observed with all guar products.

The formaldehyde may be employed in any of its forms, such as aqueous solutions, as a gas, or in the form of the polymer, paraformaldehyde. It may be added to the guar sol or may be mixed with the dry guar. In the form of a dry product the guar-formaldehyde mixture is stable for days. However, after months of storage the mixed dry product deteriorates and accordingly, the product should be used before this occurs. In preparing sols of these guar products an elevated temperature is preferred. Temperatures of 80–85° C. have been used in the examples, but other elevated temperatures may be used.

An increase in viscosity is observed with even relatively small proportions of formaldehyde. However, for most significant results a concentration of from 5 to 15% by weight of formaldehyde based on weight of the guar, is preferred. At concentrations in excess of 15% there does not appear to be a significant improvement in the viscosity over that obtained at lower concentrations and in fact the viscosity appears to fall off somewhat. Accordingly, the preferred range of concentration is from 5 to 15% of formaldehyde based on the weight of the guar.

Example 1

Five parts of paraformaldehyde were blended with 100 parts of a guar gum product and the mixture was stored for one day. The product was then made up into a 1% sol which was found to have a viscosity of 1910 centipoises while the original product had a viscosity of only 970 centipoises.

Example 2

Ten parts of paraformaldehyde were added to 100 parts of various guar fractions as 1% sols of the guar fractions were being prepared. The viscosities of the respective treated products, as well as the viscosities of the untreated products, are indicated in the following table:

| Product No. | Original Viscosity | Viscosity with Paraform. | Percent Increase |
|---|---|---|---|
| 1 | 1,300 | 1,920 | 48 |
| 2 | 1,600 | 3,500 | 119 |
| 3 | 3,200 | 5,850 | 83 |
| 4 | 2,600 | 3,130 | 20 |
| 5 | 970 | 1,380 | 42 |
| 6 | 10,800 | 11,850 | 10 |
| 7 | 1,075 | 1,150 | 7 |

Example 3

Various amounts of paraformaldehyde were added to a guar product and the effect on a 1% sol was determined. The results are indicated in the following table:

| No. | Parts of Paraformaldehyde added per 100 parts of Guar | 1% Solution Viscosity | Percent Increase |
|---|---|---|---|
| 1 | 0 | 1,300 | -------- |
| 2 | 2 | 1,320 | -------- |
| 3 | 5 | 1,670 | 28 |
| 4 | 10 | 1,920 | 48 |
| 5 | 20 | 1,450 | 12 |
| 6 | 40 | 1,620 | 25 |
| 7 | 100 | 1,560 | 20 |

Example 4

A sol was made of a guar gum product both with and without paraformaldehyde. When the paraformaldehyde was used it was employed at the rate of 10% based on the weight of the gum. These sols were tested for viscosity immediately after preparation and after one day of standing at room temperature. The comparison of the products is indicated in the following table:

| Product | Viscosity | | Percent Change |
|---|---|---|---|
| | Immediate | After 1 day | |
| Guar gum | 1,700 | 1,440 | −15 |
| Guar gum plus Paraformaldehyde | 2,130 | 3,260 | +53 |

It has been observed further that the treatment of guar with formaldehyde also improves the dry tensile strength and wet strength of paper made with guar sol as a beater additive. A 1% sol of guar was added to a paper furnish in the concentration of 2% based on the dry pulp solids. The furnish was made into paper and dried at 240° F. for 10 minutes. One paper product was made from a straight guar sol while another was made from the same concentration guar sol containing 95 parts of guar and 5 parts of paraformaldehyde. The effect on the strength characteristics of the paper is indicated in the following table:

| Product | Wet strength, grams per 15 mm. | Dry tensile strength, grams per inch |
|---|---|---|
| Guar gum | 169 | 7,309 |
| Guar 95 + paraformaldehyde 5 | 188 | 7,763 |

It is apparent from these data that there is a significant improvement both in wet and dry strengths by the treatment of the guar with formaldehyde.

It has also been observed that formaldehyde improves the ability of guar to flocculate clay slimes. This is evident from the following experiment: A clay slime from potash flotation was subjected to a settling treatment in an attempt to obtain a clear supernatant for reuse. The settling rates of the untreated slime as well as of the slime treated with guar and formaldehyde-guar were determined. The results are indicated in the following table:

|  | Am't. of 0.1% Solu. added to 100 cc. of slime, cc. | Percent Settling, 10 minutes | After 20 minutes, percent |
|---|---|---|---|
| Control |  | 2 | 8 |
| Formaldehyde Treated Guar | 1 | 53 | 82 |
|  | 2 | 64 | 81 |
| Untreated Guar | 1 | 30 | 65 |
|  | 2 | 51 | 66 |

I hereby claim as my invention:

1. Guar containing formaldehyde in the ratio of from 5-15% based on the weight of the guar.
2. Guar containing paraformaldehyde in the ratio from 5-15% based on the weight of the guar.
3. Dry guar containing paraformaldehyde in the ratio of from 5 to 15% based on the weight of the guar.
4. A guar sol containing formaldehyde in the proportions of from 5 to 15% of formaldehyde based on the weight of the guar.
5. Process of increasing the viscosity of a guar sol which comprises adding formaldehyde to said sol in the proportion of from 5 to 15% of formaldehyde based on the weight of the guar.

References Cited in the file of this patent

UNITED STATES PATENTS

| 2,375,259 | Stoyle | May 8, 1945 |
| 2,508,726 | Ramstad et al. | May 23, 1950 |
| 2,523,708 | Moe | Sept. 26, 1950 |